United States Patent [19]
Corn

[11] Patent Number: 5,350,212
[45] Date of Patent: Sep. 27, 1994

[54] VEHICLE SUNVISOR

[76] Inventor: Jack E. Corn, 1644 S. Jamestown, Tulsa, Okla. 74112

[21] Appl. No.: 917,970

[22] Filed: Jul. 24, 1992

[51] Int. Cl.$^5$ .................................................. B60J 3/02
[52] U.S. Cl. .................................. 296/97.4; 296/97.11
[58] Field of Search ............... 296/97.4, 97.9, 97.11; 160/7, 912, 913, DIG. 3

[56] References Cited

U.S. PATENT DOCUMENTS

| | | |
|---|---|---|
| 1,755,734 | 4/1930 | Hall . |
| 1,790,412 | 1/1931 | Dodge . |
| 1,848,090 | 3/1932 | Stein ........................ 296/97.11 X |
| 1,931,438 | 10/1933 | Hitz . |
| 2,638,377 | 5/1953 | George . |
| 2,978,274 | 4/1961 | Ordman ........................ 296/97.11 |
| 3,226,151 | 12/1965 | Reuther ........................ 296/97.4 |
| 3,226,152 | 12/1965 | Reuther ........................ 296/97.4 |
| 3,343,868 | 9/1967 | Manookian, Jr. .................. 296/97.4 |
| 3,403,937 | 10/1968 | Quaine ........................ 296/97.11 |
| 4,205,873 | 6/1980 | Viertel . |
| 4,353,593 | 10/1982 | Henson . |
| 4,512,605 | 4/1985 | Ascherman et al. ............. 296/97.11 |
| 4,697,843 | 10/1987 | Tomforde ........................ 296/97.4 |
| 4,824,160 | 4/1989 | Fleming ........................ 292/201 X |
| 4,902,062 | 2/1990 | Pumic ........................ 296/97.4 |
| 4,904,013 | 2/1990 | Canaoas ........................ 296/97.4 |
| 4,919,468 | 4/1990 | Abu-Shumays et al. ............ 296/97.4 |
| 5,000,506 | 3/1991 | Abu-Shumays et al. ............ 296/97.8 |
| 5,031,952 | 7/1991 | Miyamoto et al. ............. 296/97.4 |

FOREIGN PATENT DOCUMENTS

| | | | |
|---|---|---|---|
| 0068422 | 5/1980 | Japan ........................ 296/97.4 |
| 0208120 | 8/1990 | Japan ........................ 296/97.4 |
| 0212220 | 8/1990 | Japan ........................ 296/97.4 |

Primary Examiner—Dennis H. Pedder
Attorney, Agent, or Firm—Head & Johnson

[57] ABSTRACT

A sunvisor for a vehicle which includes a sunvisor shell. A gear drive mechanism drivingly engages at least one rack within the shell to move the shell in response to rotation of the gear drive mechanism. The sunvisor also includes at least one boot extending from a boot arm. A guide support structure is provided on the shell for each boot, each guide support structure including a slot therein having a flared circular opening upon at least one end of the slot, so that the shell will move linearly while the boot is in the slot and the shell will move radially when the boot is in one of the flared circular openings in response to rotation of the gear drive mechanism.

13 Claims, 8 Drawing Sheets

VEHICLE SUNVISOR

BACKGROUND OF THE INVENTION

1. Field of the Invention

The present invention pertains to a sunvisor for a vehicle which is adjustable to a multitude of positions. In particular, the present invention pertains to a sunvisor which may be mechanically adjusted to a multitude of positions including on the front and passenger side. A glare shield panel may be placed within the sunvisor for deployment.

2. Prior Art

Sunvisors for automobiles and the like are well known. In the most common sunvisor, shaft or arms extend from or are located in the roof or headliner of the vehicle. These form an axis for rotation of the sunvisor itself which can move from a position substantially flush and parallel to the headliner to a position in angular relation therewith so that the sun is blocked from the eyes of the driver or passenger.

More recent proposals have allowed the sunvisor to move about a track such as Miyamoto et al. (U.S. Pat. No. 5,031,952).

Several arrangements have been provided whereby the movement of the sunvisor is mechanized. Prior art has failed to address an effective means of moving a visor or visor-glare shield into an in use position in a plane parallel to the roof line of a vehicle, and still have the versatility of moving the visor to the side window position by sliding or pivoting the visor to that position. The present invention addresses these problems by allowing the visor and glare shield to be operated by a simpler engagement means between the visor and glare shield components. The glare shield visor can be moved into unlimited positions using the guides, elongated slots and channels proposed in this invention.

Nothing has been suggested which provides a sunvisor arrangement having a guide support in the form of a slot with flared circular openings upon at least one end of the slot so that the shell moves linearly about the slot and moves radially about the flared circular openings.

Accordingly, it is a principal object and purpose of the present invention to provide a sunvisor having a guide support in the form of a slot or slots with flared circular openings upon at least one end of the slot so that the shell moves linearly about the slot and moves radially about the flared circular openings.

SUMMARY OF THE INVENTION

The sunvisor of the present invention includes a sunvisor shell which is connected with a support assembly. The support assembly would be fastened or otherwise attached to the headliner or roof of the vehicle. The support assembly in the preferred embodiment is a track and comprises a first portion and a second portion in angular relation to the first portion. Extending from the support assembly is a pair of boot arms. Each boot arm terminates in a boot which extends radially from its respective boot arm. Each boot arm has a pivot joint so that each boot is rotatable radially.

Each boot resides within a guide support structure. Each boot is substantially oblong in shape and has a pair of opposed, flat surfaces. Each boot remains stationary with respect to the sunvisor shell which moves thereabout.

Surrounding the guide support structure is a spring cap which has a ribbed surface, a flat spring and a king nut pressing against the outside of the support and a flat washer and king nut pressing against the inside. Each guide support structure includes an elongated slot. Upon at least one end of the slot is a flared circular opening. The surface surrounding the flared circular opening is raised.

When the boot is in one of the flared circular openings, the ribs will mesh with receiving ribs outside of the circular opening. The spring cap will thus supply enough force to press the ribs against the receiving ribs on the guide support. The radial position of the sunvisor shell will thus remain stationary until overcome by the user or by the force of a motor.

The sunvisor can also include a gear drive mechanism. A shaft passes through one of the boots and extends to a gear which is drivingly engaged with a worm gear. The worm gear is at the terminus of a rotatable, flexible shaft. The flexible shaft is rotated by a motor.

The shaft, interior to the sunvisor shell turns a pair of gears which extend radially from the shaft. Each gear meshes with a rack. Rotation of the shaft will cause the gears to rotate. Rotation of the gears causes the racks to move linearly moving the sun visor shell.

A glare shield can be attached to the racks. In this embodiment, the racks are extendible, flexible and not permanently secured to the sunvisor shell. A switch may be operated so that the rack is either movable with respect to the shell or is stationary with respect to the shell. When the racks are stationary with respect to the shell, the rotation of the gears causes the shell to move with respect to the boots. Alternatively, when the switch allows the racks to move, rotation of the gears causes the racks to move which in turn causes linear movement of a glare shield which is in the initial position within the shell. Depending upon rotation of the gears, the glare shield will either extend from the shell or will retract into the shell through an opening upon the shell.

The glare shield is retained between support rails and rack gear retaining rails. The movement of the sunvisor shell and the glare shield is accomplished by a motor which is controlled by a switch.

A solenoid operates a plunger which may have an extension. When the plunger extension is extended, the racks are stationary with respect to the sunvisor shell and the shell will move. When the plunger extension is retracted, by operation of the solenoid, rotation of the gears will move the racks, thereby moving the glare shield. The sunvisor may also be arranged so that the sunvisor shell is on either the driver window or the passenger window. Each boot arm terminates in a block which is allowed to travel within the support assembly. A continuous belt travels within the track and passes around each block. Rotation of a track assembly gear by a track motor will move the blocks. Accordingly, the sunvisor shell may be moved between the position for use in the front window and for use in the side window.

BRIEF DESCRIPTION OF THE DRAWINGS

FIG. 15 is a view of the plunger extension of FIG. 1.

DETAILED DESCRIPTION OF THE PREFERRED EMBODIMENT

Figure 1:
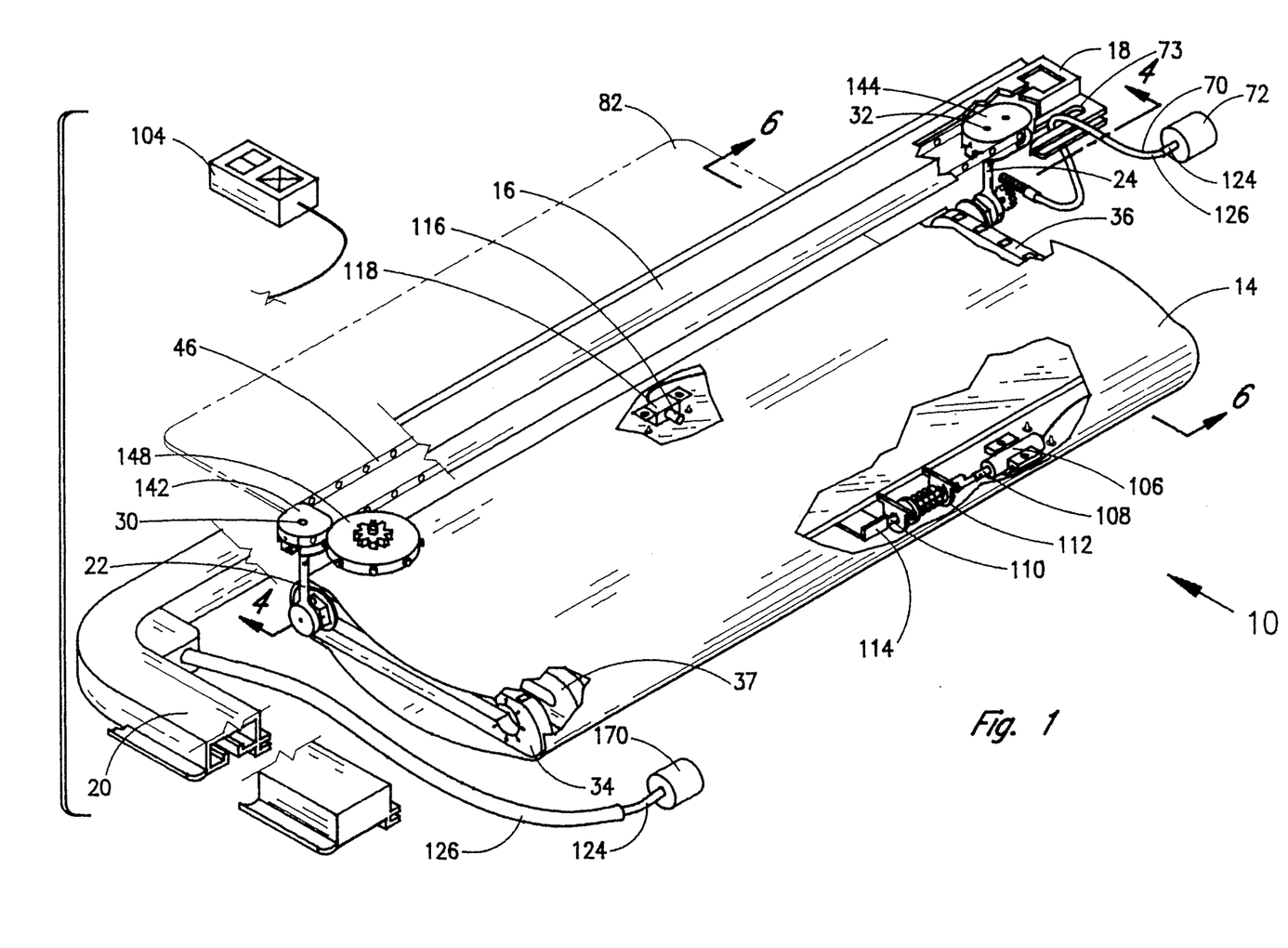
FIG. 1 is a perspective view of a sunvisor device constructed in accordance with the present invention showing several portions cut-away for clarity.

Referring to the drawings in detail, FIG. 1 illustrates a perspective view of a sunvisor 10 constructed in accordance with the present invention which is shown apart and detached from a vehicle (not shown) and for purposes of understanding has the gear moved to the right, and the flexible shaft slot is cutaway. The sunvisor includes a sunvisor shell 14 which may be made of any suitable material such as plastic, fiberglass or metal. The shell may be covered with a material for a finished look and to match the interior of the vehicle.

The sunvisor shell can be connected with a support assembly 16 such as a track. The track assembly 16 would be connected or attached to the headliner or roof of the vehicle (not shown). The track assembly includes a first portion 18 which would be spaced from and substantially parallel with the front windshield. The track assembly also includes a second portion 20 in angular relation to the first portion and is substantially parallel with the driver front window. It will be understood that the track assembly may, alternatively, have a second portion parallel with the passenger front window. The operation of the track assembly will be explained in detail below.

Extending from the track assembly 16 is a pair of boot arms 22 and 24. Each boot arm terminates in a boot 26 and 28, respectively, which extends radially from each boot arm. Each boot arm has a pivot joint 30 and 32, respectively, so that each boot is rotatable radially.

Figure 2:
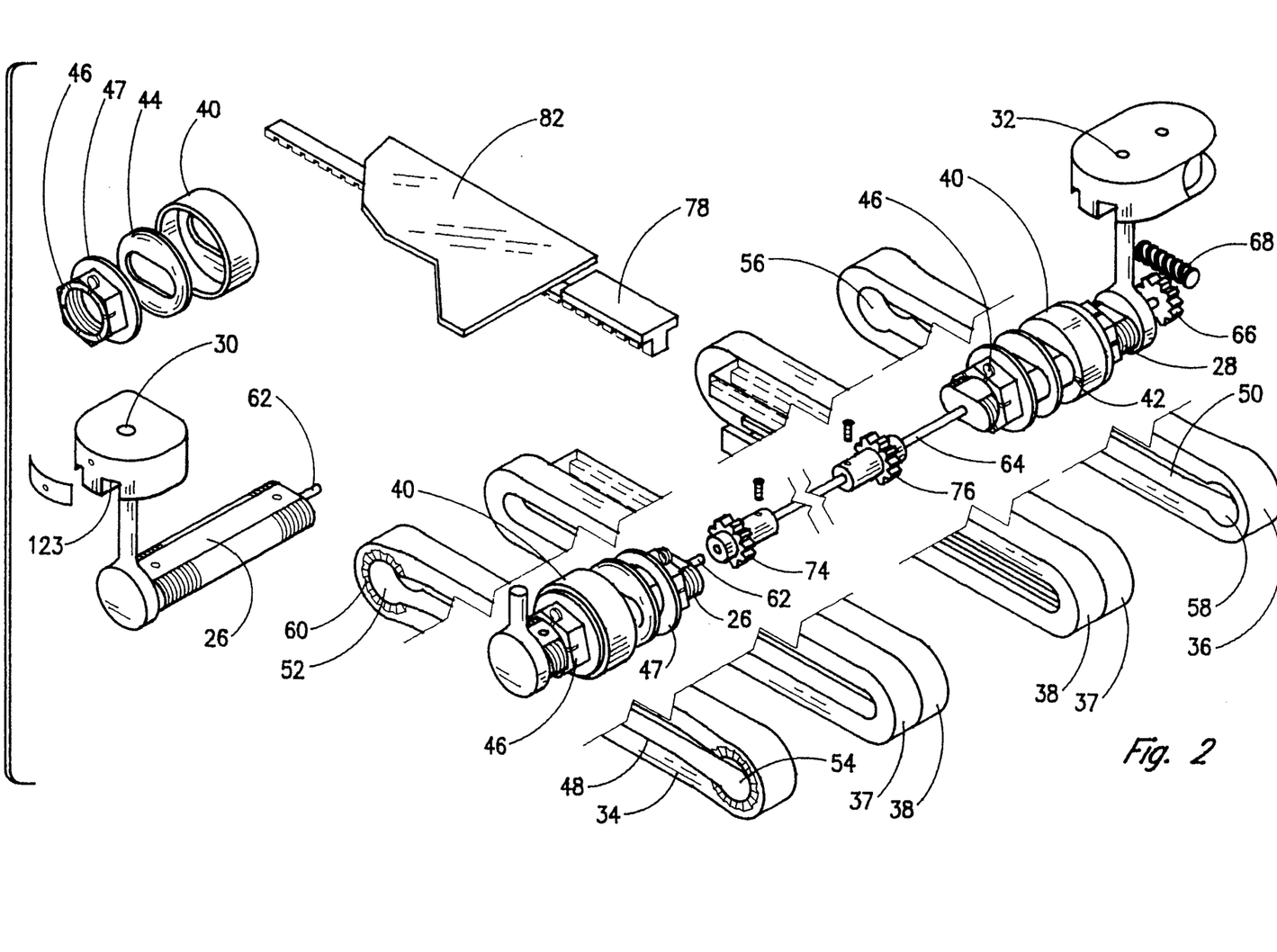
FIG. 2 is an exploded portions of the sunvisor shown in FIG. 1.

Each boot 26 and 28 resides within a guide support structure 34 and 36 which may be readily seen from the exploded view shown in FIG. 2. Each boot is substantially oblong in shape having a pair of opposed, flat surfaces. The boots can be threaded and readily seen in FIG. 2.

As will be appreciated from the present description, each boot remains stationary with respect to the sunvisor shell which moves thereabout. The guide support structure is surrounded by a spring cap 40 which has an oblong interior cut out and ribbed surface 42, a flat spring 44 and a king nut 46 upon the outer surface. On the inner surface the guide support structure has a flat washer 47 which has an oblong interior cut out and a king nut 46, all seen in FIG. 2.

Each guide support structure 34 and 36 includes an elongated slot 48 and 50, respectively. Upon at least one end of the slot is a flared circular opening. Slot 48 thus includes flared circular opening 52 and 54 while slot 50 includes flared circular openings 56 and 58.

The ribs on the spring cap 40 remain parallel to and within the elongated slot until the boot is within one of the flared circular openings.

As will be appreciated, the boot remains stationary and the sunvisor shell moves so that the slot moves in relation to the boot. When the boot is outside of the slot, in other words, in one of the flared circular openings, the ribs will mesh with receiving ribs 60 which are upon a raised surface. The spring cap will thus supply enough force to press the ribs against the receiving ribs on the guide support. The radial position of the sunvisor shell will thus remain in place until overcome by the user or by the force of the motor which will be described hereinafter.

Figure 3:
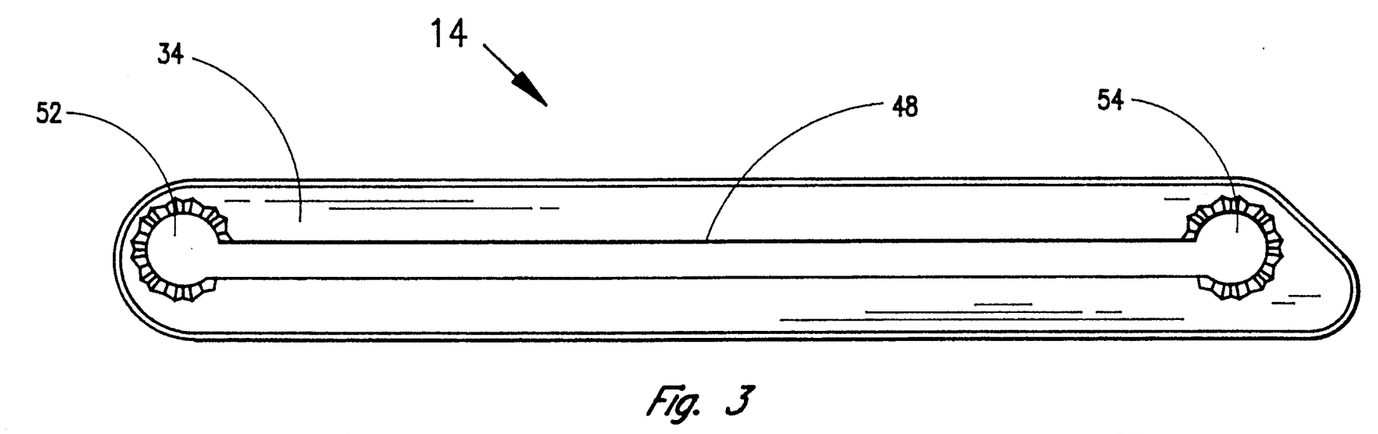
FIG. 3 is a side view of the sunvisor shown in FIG. 1.

FIG. 3 illustrates a side view of one of the guide support structures 34. The slot 48 is interior to sunvisor shell 14. The flared circular openings 52 and 54 are at opposite ends of the slot. The flared circular openings can be centered or offset. The exterior design or shape of the sunvisor shell may also be observed and is a matter of choice.

It will be appreciated that the exterior shape of the sunvisor shell may take other forms for aesthetic or other reasons.

With further reference to FIGS. 1 and 2, the gear drive mechanism in the present invention may be observed. Protruding outward from the end of the boot 26 is a short bearing rod 62. The bearing rod is received by a longitudinal hole in gear 74. Extending outward from the opposite boot 28 is a shaft 64 which passes through the boot 28 and is rotatable therein and extends to a gear 66. The gear is drivingly engaged with a worm gear 68. The worm gear is at the terminus of a rotatable, flexible shaft 70 as seen in FIG. 1. Any type of gear arrangement could be employed. The flexible shaft which comprises a core 124 and a casing 126 is rotated by a motor 72 such as a small electrical motor which might be recessed within the headliner or elsewhere within the vehicle. As shown in this embodiment, the flexible shaft slides within a slot 73 as the visor is moved laterally on the track. The motor would be powered by the electrical system (not shown) of the vehicle. It will be understood that other mechanisms might be utilized to rotate the shaft 64 such as hydraulic or pneumatic mechanisms.

Returning to a consideration of FIG. 2, the shaft 64 turns a pair of gears 74 and 76 which extend radially from the shaft and can be molded to the shaft or mounted as shown with set screws and divots in the rod.

Each gear 74 and 76 meshes with a rack 78 and 80. The gears rest in and are guided by elongated slots upon inner supports 90 and 92. Rotation of the shaft 64 by the motor will cause the gears 74 and 76 to rotate. Rotation of the gears will cause the racks 78 and 80 to move linearly.

In at least one embodiment, the rack remains stationary with respect to the sunvisor shell 14. As will be described herein, in other embodiments, the rack is flexible and movable to allow for extension or retraction of a glare shield. FIGS. 1 and 2 illustrate an embodiment with an extendible and retractable glare shield 82.

Figure 4:
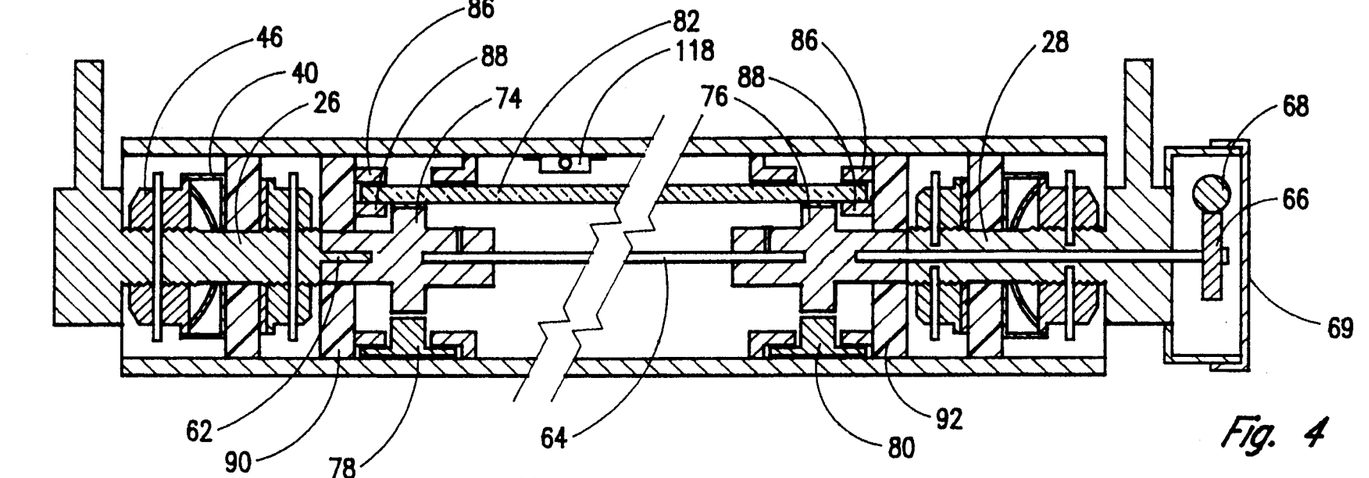
FIG. 4 is a sectional view taken along section line 4—4 of FIG. 1.

FIG. 4 is a sectional view taken along section line 4—4 of FIG. 1.

In the embodiment shown in FIG. 4, the glare shield 82 is attached to the racks 78 and 80. The racks are flexible and extend beyond the edge of the glare shield and are not permanently secured to the sunvisor shell. Rather, a switch 104 may be operated so that the rack is movable with respect to the shell or is stationary with respect to the shell. When the racks 78 and 80 are stationary with respect to the shell, the rotation of the gears 74 and 76 will cause the shell to move with respect to the boots. In the alternative, when the switch allows the racks to move, rotation of the gears 74 and 76 will cause the racks to move which will, in turn, cause linear movement of the glare shield 82. Depending upon the rotation of the gears, the glare shield will either extend from the shell or retract into the shell through slot opening 84.

Figure 5:
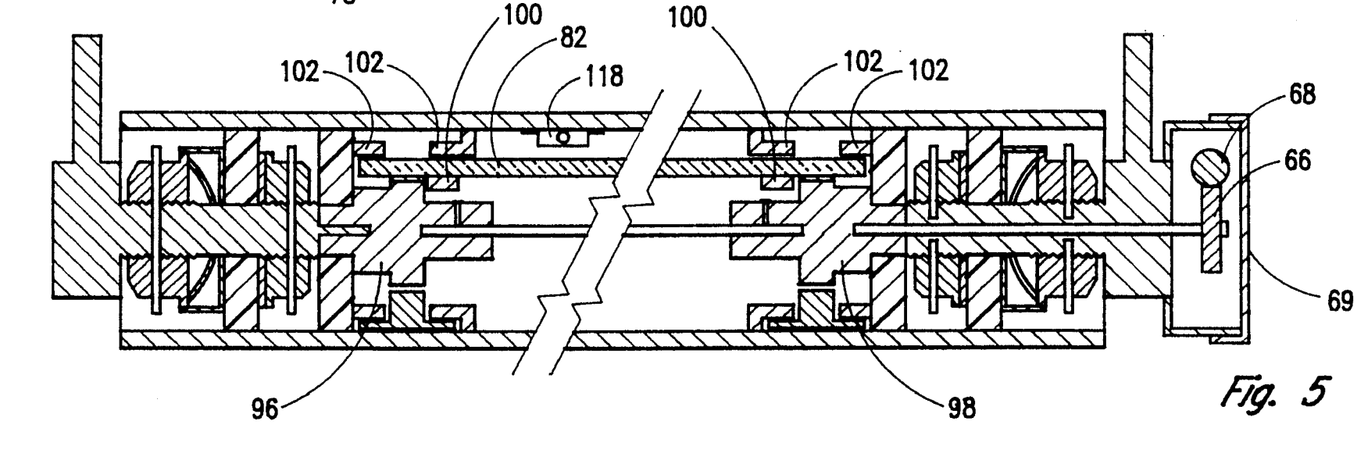
FIG. 5 is a sectional view of an alternate embodiment of the sunvisor.

The glare shield is retained between rack gear retaining rails 86 and support rails 88. Rack gear retaining rails 86 also serves as a guide for the flexible rack gear 78. They are upon the inner and upper surface of the sun visor shell and continue on around to the lower surface. Lateral movement of the glare shield 82 is prevented by supports 90 and 92. FIG. 5 illustrates an alternate embodiment from those shown in FIGS. 1 through 4.

The embodiments shown in FIG. 5 also includes a glare shield 82. The gears 96 and 98 are shaped differently although they operate in the same manner. Additionally, a single lower rail 100 for each side of the glare shield is provided in a different position as well as a pair of rack gear retaining rails 102.

Returning to a consideration of the embodiment of the sunvisor 10 shown in FIGS. 1 through 4, the operation of the sunvisor shell and the glare shield 82 may be observed. When the drive gears 74 and 76 are rotated by rotation by the shaft 64, they engage with the teeth on the gear racks 78 and 80. To move the sunvisor shell 14 either forward or backward, the sunvisor shell is moved with relation to the boots 26 and 28 which slide within the slots 48 and 50. The boots 26 and 28 remain stationary at all times and the sunvisor shell itself moves with respect thereto. While the boots are in the slots, the sunvisor shell moves linearly with respect to the boots. When the boots are within either of the flared circular openings, the sunvisor shell moves radially with respect to the boots. The movement of the sunvisor shell is accomplished by the motor 72 which is controlled by a switch 104 as seen in FIG. 1. The switch may take various forms as are well known.

The sunvisor 10 also includes a solenoid 106 which operates a plunger 108 to extend or retract the plunger. The plunger may have an extension 110 with a spring 112. Upon the end of the extension is a small disc 109 which reduces friction for ease of sliding over the latch 114. When the plunger extension 110 is extended, the racks 78 and 80 are stationary with respect to the sunvisor shell 14. When the plunger extension 110 is retracted by operation of the solenoid 106, latch 114 is retracted and rotation of the gears 74 and 76 will move the racks 78 and 80. In this position, the racks 78 and 80 are free to move with respect to the sunvisor shell. Accordingly, the sunvisor shell will remain stationary because of the spring cap assembly 40 and the racks will move thereby moving the glare shield 82. The glare shield 82 will thus be extended or be retracted through the opening.

The spring 112 causes the extended plunger to remain extended except when energized. The solenoid 106 will also be controlled by the switch 104. It will be appreciated that either a linear or rotary solenoid or other switching mechanism might be employed.

An optional safety mechanism may be utilized. When the glare shield 82 is fully extended, the latch 114 extending from the glare shield will hit a plunger 116 of a stop switch 118 which interrupts power and stops movement of the glare shield. This prevents the glare shield from depending from the slot and further prevents the whole assembly from rotation and hitting the user.

The glare shield can be made of any light diffusing material. It may be somewhat opaque if to have an extended visor rather than glare shield is desired. Alternatively, a vanity mirror could be incorporated into the visor.

Figure 6:
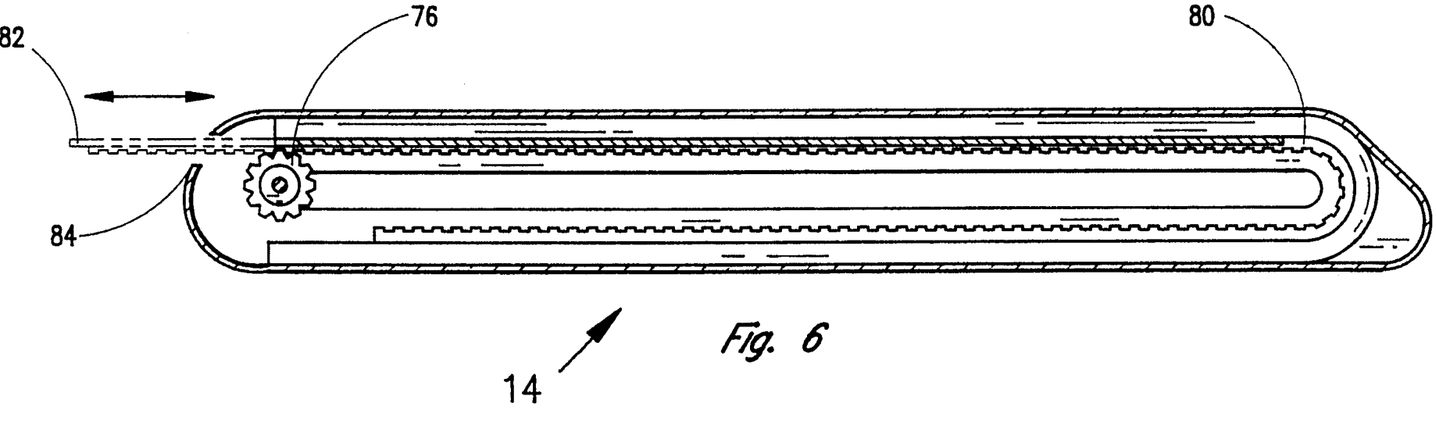
FIG. 6 is a sectional view taken along section line 6—6 of FIG. 1.
Figure 7:
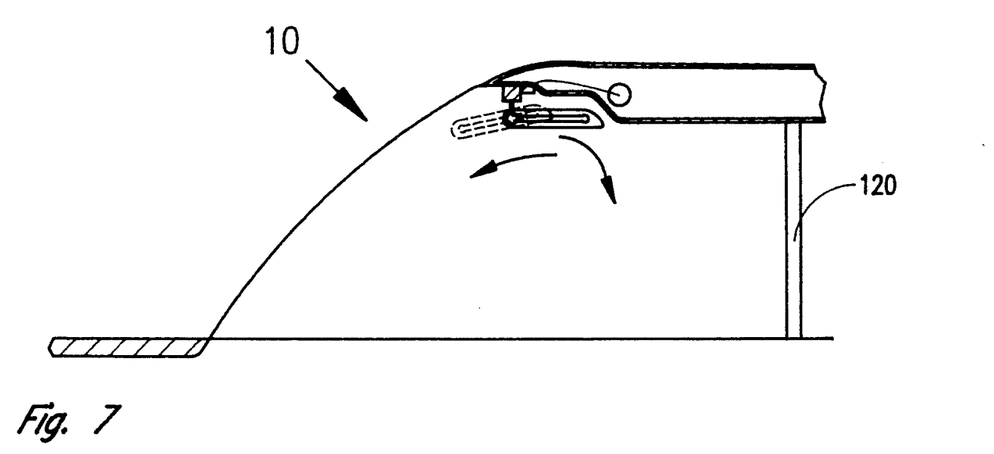
FIGS. 7, 8 and 9 are simplified diagrams showing the use and positioning of the sunvisor with respect to a vehicle.
Figure 8:
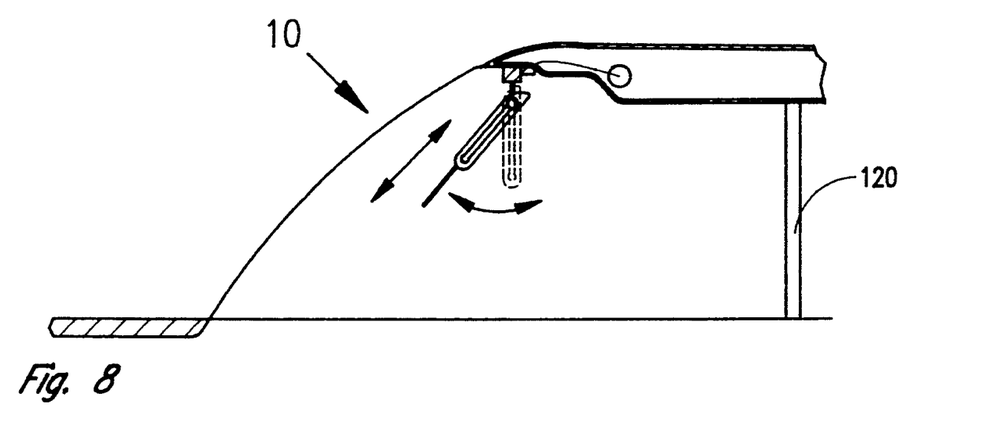

FIG. 6 shows a sectional view illustrating movement of the glare shield 82 which is taken along section line 6—6 of FIG. 1. In this view the glare shield 82 is partially deployed through slot opening 84. It can be seen that the flexible gear rack 76 and 80 are moved in their rack gear retaining rails 86 and 88 as the glare shield is extended or retracted. FIGS. 7 and 8 show the operation of the sun visor 10 with respect to a vehicle 120. FIG. 7 illustrates the linear movement of the sunvisor shell with respect to the boots 26 and 28. Also shown as an optional placement is the motor and flexible shaft.

FIG. 8 illustrates the radial movement of the sunvisor shell while the boots are within one of the flared circular openings.

Figure 9:
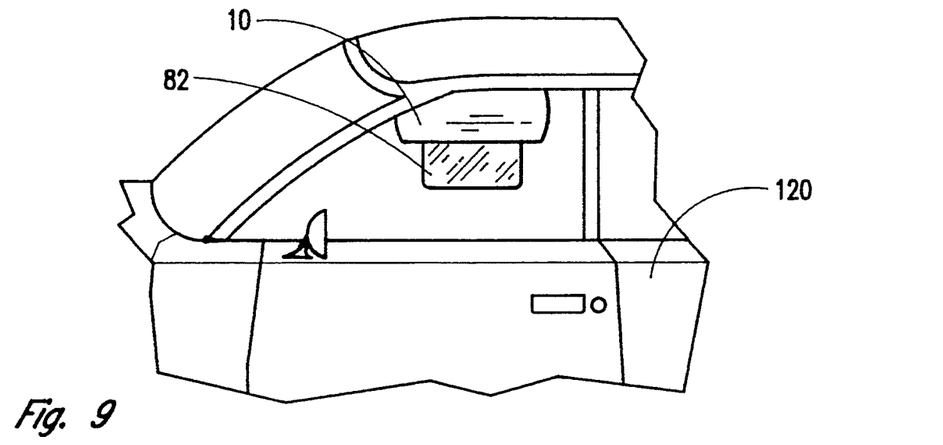

Finally, FIG. 9 illustrates movement of the sunvisor shell on the track assembly 16 so that the shell has moved over to the passenger side window. Additionally, FIG. 9 shows the glare shield 82 in the extended position.

Returning to a consideration of FIG. 1, the operation of the sunvisor shell 14 with respect to the track assembly 16 may be observed. Each boot arm 22 and 24 terminates in a block 142 and 144, respectively, so that the blocks are allowed to travel within the track assembly. A continuous belt 146 travels within the track and is attached to and passes around the blocks. In the embodiment shown, the belt is elongatable. Rotation of a track assembly gear 148 (which is shown slid out and to the right of actual placement) by a track motor 170 will move the belt and, therefore, blocks 142 and 144. Accordingly, the sunvisor shell will be moved. As visor shell is moved, the flexible shaft 70 slides in slot 73.

Figure 10:
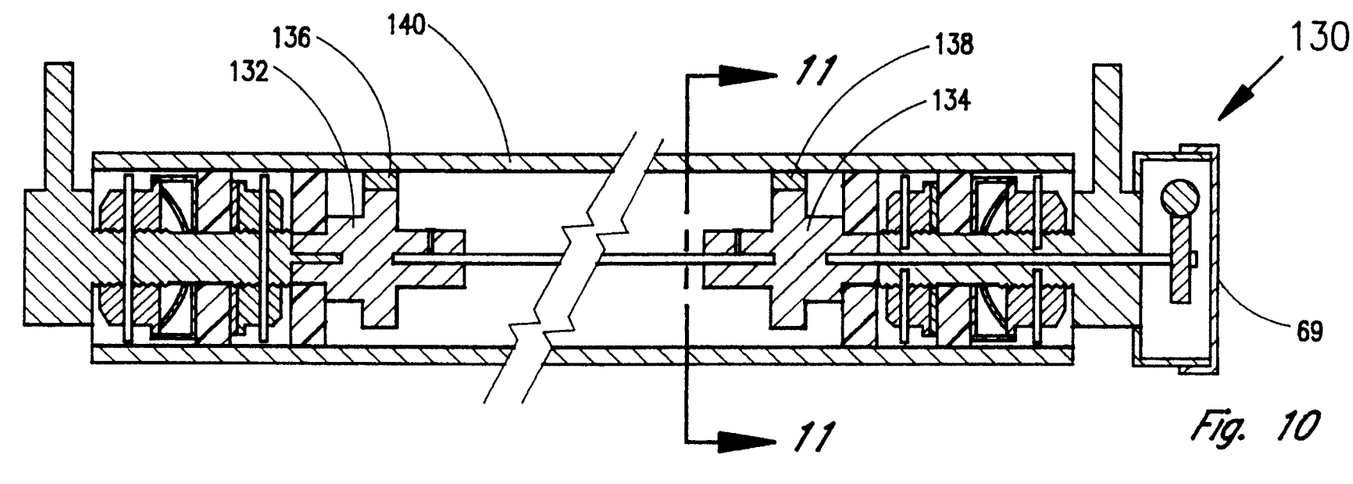
FIG. 10 is a sectional view of an alternate embodiment of the sunvisor without a glare shield.

FIG. 10 illustrates an alternate embodiment 130 of the sunvisor without a glare shield. The gears 132 and 134 engage with racks 136 and 138 which are secured to the sunvisor shell 140.

Figure 11:
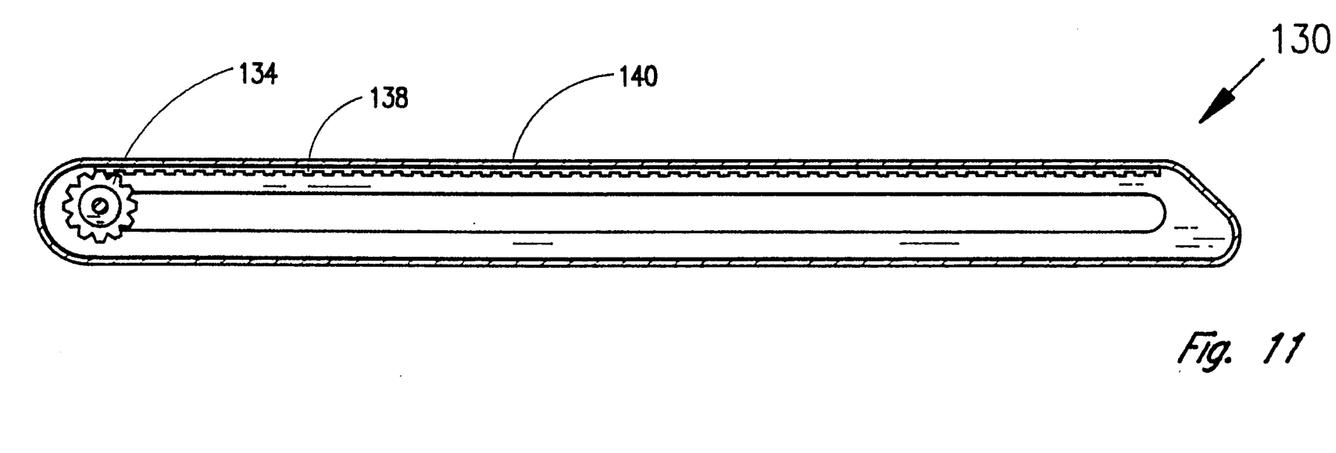
FIG. 11 is a sectional view taken along section line 11—11 of FIG. 10.

FIG. 11 illustrates a sectional view taken along line 11—11 of FIG. 10 and shows a fixed gear rack upon the top of housing.

Figure 12:
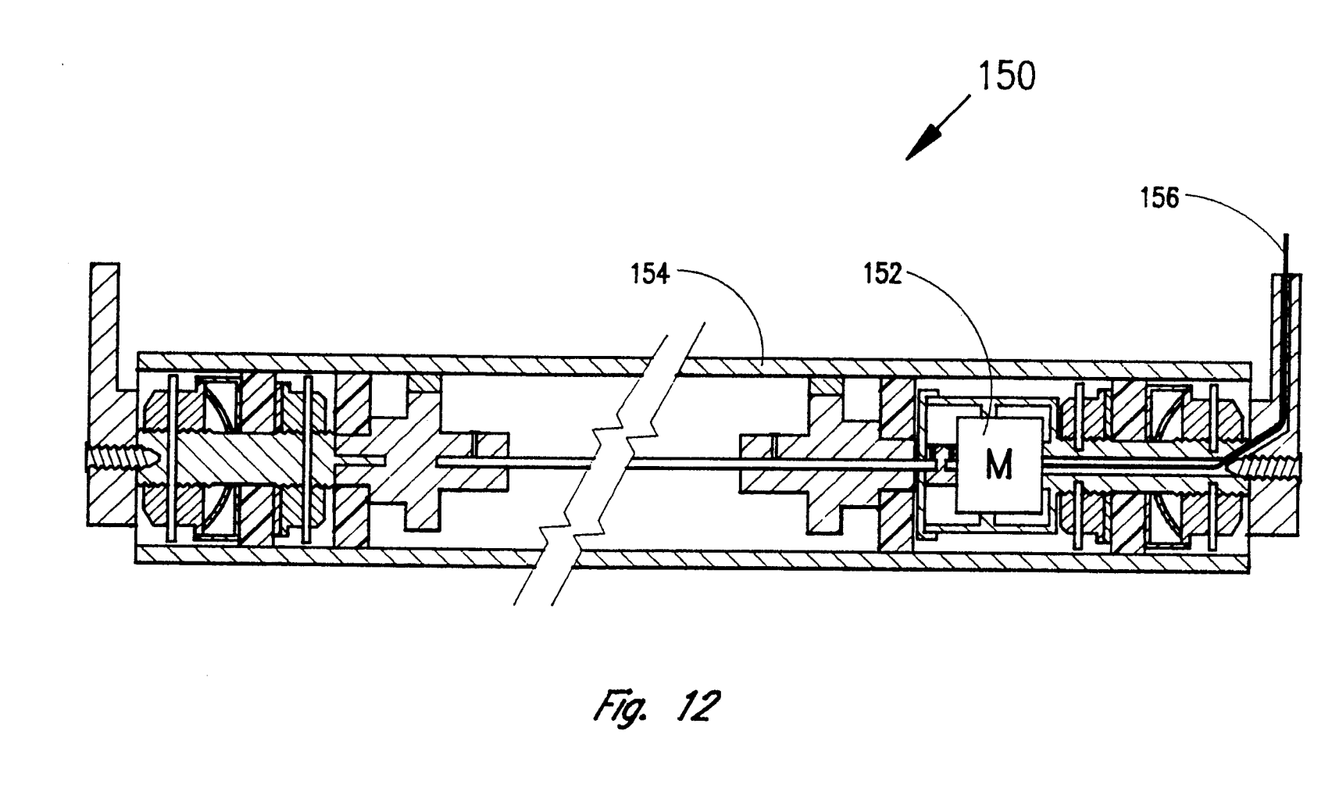
FIG. 12 is an alternate embodiment of the sunvisor without a glare shield and with the motor located within the sunvisor shell.

FIG. 12 illustrates a further embodiment of the sunvisor 150 without a glare shield. The motor 152 is located wholly within the sunvisor shell 154. The motor 152 would be supplied with electricity via line 156. The sunvisor 150 would operate substantially as in the other embodiments.

Figure 13:
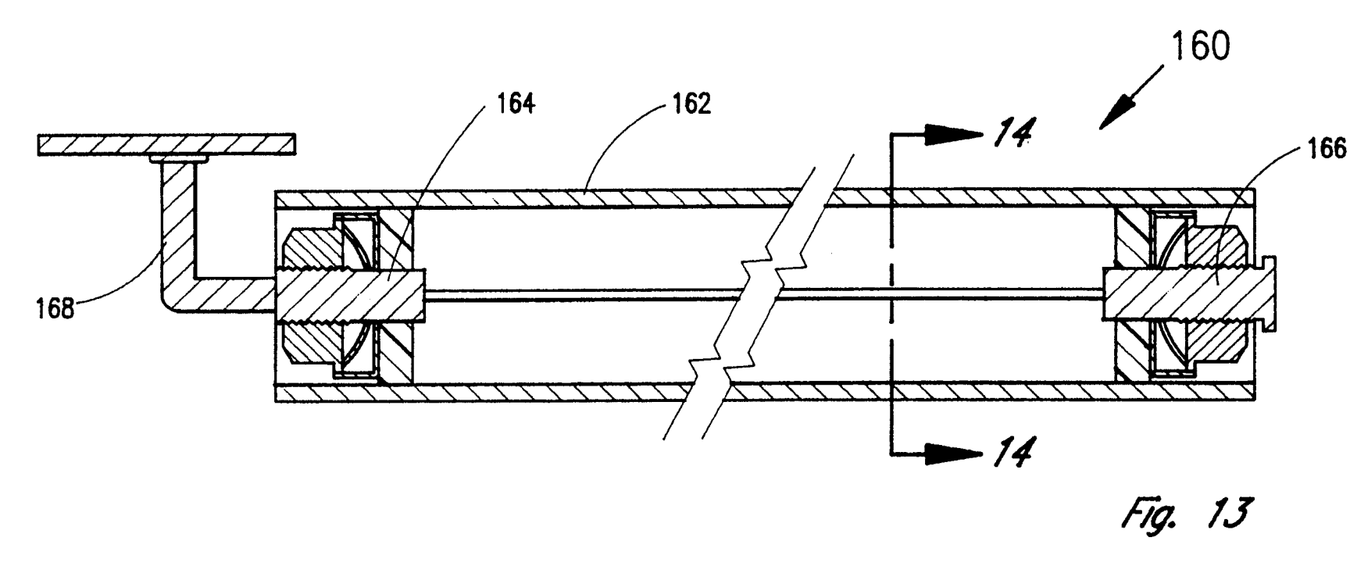
FIG. 13 is a further alternate embodiment of the sunvisor which may be manually positioned.

Finally, an alternate embodiment of the sunvisor 160 is shown in FIG. 13. The sunvisor shell 162 will be moved manually with respect to the boots 164 and 166.

Figure 14:
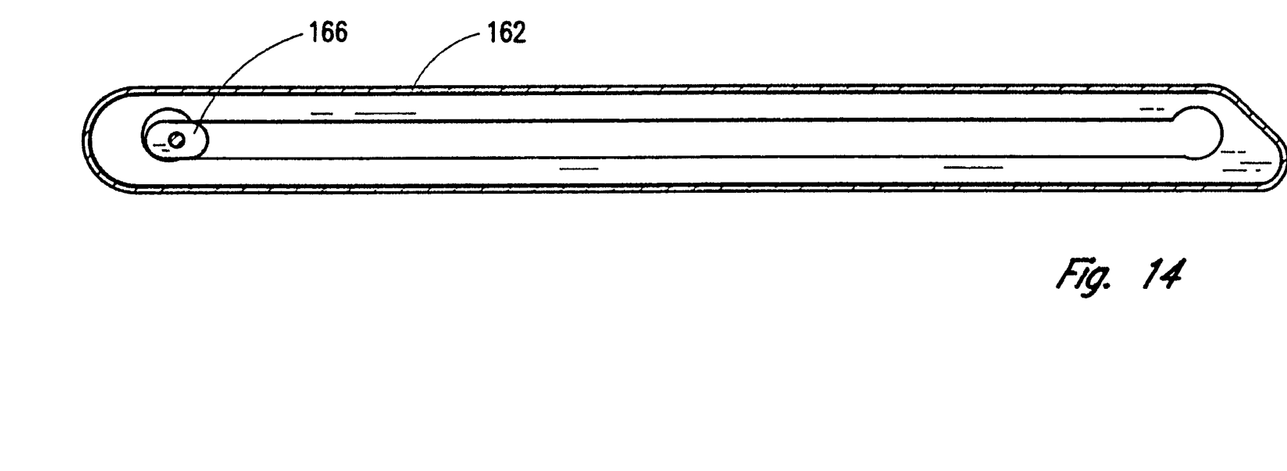
FIG. 14 is a sectional view taken along section line 14—14 of FIG. 13.

FIG. 14 is a sectional view taken along line 14—14 of FIG. 13.

In this embodiment, the boots 164 and 166 are upon the shaft and fixedly mounted to the shaft which also serves as a visor roof support.

Whereas, the present invention has been described in relation to the drawings attached hereto, it should be understood that other and further modifications, apart from those shown or suggested herein, may be made within the spirit and scope of this invention.

What is claimed is:

1. A sunvisor for a vehicle, which sunvisor comprises:
   (a) a sunvisor shell;
   (b) gear drive means to drivingly engage at least one rack within said shell to move said shell in response to rotation of said gear drive means;
   (c) at least one boot; and
   (d) guide support means on said shell for each boot, each guide support means including a slot therein having a flared circular opening upon at least one end of said slot, so that said shell will move linearly while said boot is in said slot and said shell will move radially when said boot is in said circular opening in response to rotation of said gear drive means.

2. A sunvisor for a vehicle as set forth in claim 1 wherein said gear drive means includes motor means to rotate a shaft, and at least one gear extending radially from said shaft to engage said rack.

3. A sunvisor for a vehicle as set forth in claim 2 having two said gears axially aligned with a pair of said boots.

4. A sunvisor as set forth in claim 1 wherein each said boot is oblong having a pair of opposed, flat faces.

5. A sunvisor as set forth in claim 1 having a pair of said boots spaced from and opposed to each other.

6. A sunvisor as set forth in claim 1 wherein each boot has a boot arm having a block which is slidable within a track, said track connectable to said vehicle interior.

7. A sunvisor as set forth in claim 6 wherein each boot arm is articulated so that said blocks pivot with respect to said boots.

8. A sunvisor for a vehicle, which sunvisor comprises:
   (a) a sunvisor shell;
   (b) a support attachable to said vehicle;
   (c) at least one boot extending from said support; and
   (d) guide support means on said shell for each boot, each guide support means including a slot therein having a flared circular opening in at least one end of said slot, so that said shell will move linearly while said boot is in said slot and said shell will move radially when said boot is in said circular opening in response to movement of the shell.

9. A sunvisor for a vehicle, which sunvisor comprises:
   (a) a sunvisor shell;
   (b) gear drive means to rotate a shaft within said shell to move said shell in response to rotation of said gear drive means;
   (c) a track assembly parallel to a front windshield of said vehicle;
   (d) an elongated opening longitudinally on said track; and
   (e) an elongated slot parallel to said elongated opening for receiving a flexible shaft wherein said flexible shaft can slide in said slot as the sunvisor shell is moved upon said track.

10. A sunvisor for a vehicle as set forth in claim 9 which includes a support having a boot arm assembly depending from said track.

11. A sunvisor for a vehicle as set forth in claim 10 wherein said boot arm assembly comprises a boot arm, block and boot, said boot arm is articulated so that said blocks pivot with respect to said boots.

12. A sunvisor as set forth in claim 9 which includes a motor to rotate said flexible shaft which rotates said shaft moving said shell in response to rotation of said shaft.

13. A sunvisor for a vehicle as set forth in claim 8 including means to move said support in relation to said vehicle.

* * * * *